United States Patent Office 3,062,242
Patented Nov. 6, 1962

3,062,242
PROCESS FOR INCORPORATING A FINISHING AGENT IN A REINFORCED PLASTIC
Byron M. Vanderbilt, Westfield, N.J., assignor to Esso Research and Engineering Company, a corporation of Delaware
No Drawing. Filed Oct. 1, 1958, Ser. No. 764,512
9 Claims. (Cl. 138—141)

This invention relates to a method for applying a finishing agent to a reinforcing element and more particularly it relates to an improved reinforced plastic therefrom.

It is known that a reinforced plastic can be prepared by incorporating a reinforcing element, e.g., glass fibers in the form of cloth, rovings, strands, matting, etc., in a polydiolefin resin. In the past, glass has been coated with a finishing agent, e.g., an unsaturated organic silane, before laminating it with the curable resin, whether a polyester, polysilicone, or diolefin polymer. This expensive operation is employed to provide a bonding agent between the glass and the cured resin. Also, if moisture is on the surface of the fiber glass, inferior bonding results in the reinforced plastic therefrom. This moisture can be removed by heating, or a combination of heat and vacuum, but the high temperature required may actually decompose the finishing agent. Therefore, the strength of the reinforced plastic is substantially decreased.

It has now been found that a silane ester finishing agent can be incorporated into a resinifiable polymer mix and can be applied to the glass as it is being laminated with the polymeric mix. This eliminates the expensive operation of coating the glass before lamination. The satisfactory results are surprising since previously silanes have been applied to glass by means of aqueous solutions or the use of highly active chlorosilanes as liquids or gases. Furthermore, any deleterious moisture or protective size on the surface of the glass fibers can be removed by heating and/or burning at elevated temperatures. The heat cleaned glass is immediately laminated with a resinifiable polymer mix with the finishing agent incorporated therein. The laminate is subsequently cured to a unitary reinforced plastic.

The reinforcing elements that are applicable to this invention include such items as mineral materials, e.g., glass, asbestos, mica, rock, and celite; vegetable materials, e.g., iron, aluminum, and copper. However, the preferred material is glass. Reinforcing elements may be used up to 80% in the reinforced plastic, preferably up to 35 to 80%. It is advantageous to remove moisture from the reinforcing elements, e.g., glass cloth before lamination with the resinifiable mix. The glass may have previously been coated with a size, e.g., polyvinyl acetate or a starch-mineral oil mixture, and some moisture may have accumulated on the surface. Therefore, it may be advantageous to heat the glass fibers or the like to a temperature between 200° and 1500° F. in order to remove the moisture and/or burn off the protective size.

The reinforcing agent, which may be heat cleaned, is laminated with a resinifiable polymer mix. This mix generally comprises a curable polymer, a crosslinking agent, a catalyst, and a finishing agent. Crosslinking agents may be added to the curable polydiolefin oil to impart an effective crosslinking of the resin. Such agents comprise the following compounds: vinyl aromatics as styrene and vinyl toluene; halo styrenes; vinyl naphthalenes; alkyl acrylates and methacrylates; and allyl esters. Preferred compounds are diallyl phthalate and the styrenes. The especially preferred compound is vinyl toluene or monomethyl styrene. The crosslinking agent should be incorporated in the range of 0 to 60% of the curable liquid mix, preferably 30 to 50%. A catalyst is incorporated in the range of 0.2 to 10 parts, preferably 2 to 5 parts, and should be of the free radical or peroxide type. Preferred catalysts are dicumyl peroxide and/or ditertiary butyl peroxide.

Curable polymers preferred in the resinifiable mix of this invention are prepared from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, and the like, may also be used.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about $-15°$ C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 wt. percent (based on sodium) of an alcohol such as methanol, isopropanol, or an amyl alcohol in order to overcome the initial induction period. The resulting product may vary in viscosity from 0.15 to 20 poises, and may be altered as desired for use in the curable liquid mix. The preparation of this oil is described in U.S. Patents 2,762,851 and 2,581,094 which are incorporated herein by reference.

It is critical for the success of this invention to incorporate a heat reactive hydrocarbon polymer, e.g., a polydiolefin, in the resinifiable mix which also has the finishing agent, e.g., vinyl triethoxy silane, therein. Other thermosetting resins, e.g., polyesters, are inoperative probably because they have reactive polar groups. The silane esters apparently become attached to the glass by reacting with the (OH) groups on the surface of the glass, liberating an alcohol from the exchange reaction with the silane ester. Thus, ineffective bonding with the glass is provided if ester exchange occurs with the polyester resin and the reinforced plastic therefrom is relatively weak.

In accordance with this invention, 0.1 to 5 parts, preferably 0.5 to 1 part, of a silane ester, based on the fiber glass, is included within the resinifiable mix in addition to the curable polymer, crosslinking agent, and catalyst heretofore described. The finishing agents within the purview of this invention comprise unsaturated organic silanes having the formula:

$$R_nSi(OR_1)_{4-n}$$

wherein R is an unsaturated group, e.g., vinyl allyl, methallyl or crotyl group; $n$ is a positive integer equal to 1, 2, or 3; and $R_1$ is an alkyl or aryl group or substitutes thereof. Preferred compounds are vinyl triethoxy silane, vinyl trimethoxy silane, vinyl silane ester of monethyl ether of ethylene glycol, and diallyl diethoxy silane. It is believed that the above-described silanes react with the hydroxyl groups in the glass, as illustrated below:

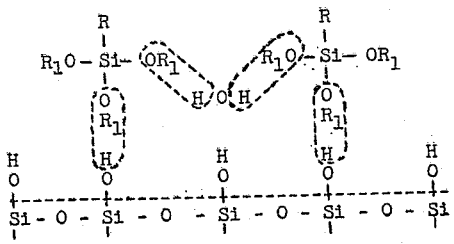

The unsaturated, e.g., vinyl, portion of the molecule, bound to the glass through the silicon atom, reacts with the unsaturated liquid polymer oil described above during the curing step, and therefore bonds the polydiolefin resin to the glass.

A reinforced plastic structure can then be provided by laminating the reinforcing element with the resinifiable polymer mix. A laminate, according to this invention, is defined as a composite mass of a reinforcing agent and a thermosetting resin. This, therefore, includes layers of cloth and resin; fibers embedded in a resin; and fibers saturated with resin and formed in a hollow cylindrical pipe. Accordingly, lamination can be accomplished by any known method. For example, the resin mix can be combined with glass fibers by brush impregnation; by being poured into the center of several plies of glass cloth or matting assembled on cellophane-covered glass plate; and by dipping the cloth or rovings into the resin mix.

Thus, one method used in the manufacture of solid rectangular sheets, is to form layers of curable polymer mix and glass fiber. After the desired thickness is obtained, the sheet is cured to a unitary reinforced plastic. Another method can be used for the manufacture of cylindrical hollow pipes. Glass fibers can be dipped in the curable polymer mix and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S. Patent 2,714,414). A suitable angle is that described in U.S. Patent 2,747,626 where the angle A is determined by the equation $3 \sin^2 a + (2/m) \sin a = 1$ in 1 in which $m$ is the ratio of the total cross-sectional area of all the helically disposed fibers to the total cross-sectional area of all the longitudinally disposed fibers. After the desired shape is obtained, the wrapping can be cured to form the unitary rigid pipe.

The mass of resinifiable polymer mix with reinforcing elements therein is subsequently cured. A suitable, but not the only, method is by baking in a press mold at a temperature between 250° to 400° F. for between 5 minutes and 2 hours. It may also be advantageous to utilize a postcure between 290° and 350° F. for 1 to 24 hours.

Thus, in accordance with this invention an improved process is available for the manufacture of a reinforced plastic. It is now possible to obtain a more uniform coating of a finishing agent on the reinforcing element therein. Furthermore, this invention eliminates an expensive operation and heat cleaned glass can be used directly in the fabrication of a reinforced plastic.

The following examples are submitted to illustrate and not to limit this invention.

EXAMPLE I

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 Kauri-Butanol value (reference scale: Benzene-100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poises at 50% NVM in Varsol solution and the nonvolatile portion thereof had an average molecular weight of about 8,000.

A resinifiable polymer mix was provided comprising 15 parts of the above curable polydiolefin oil, 50 parts of vinyl toluene, 1.5 parts of dicumyl peroxide, and 1.5 parts of ditertiary butyl peroxide. Laminate A was prepared by saturating 14 plies of 181 glass cloth with the above polymer mix. The saturated glass cloth was then placed in layers in a ⅛-inch mold and cured by baking at a temperature of 300° F. for 1 hour. The reinforced plastic laminate, 65% glass cloth, was removed from the mold and subjected to a postcure for 2 hours at 320° F.

Laminate B was prepared in a similar manner except that one part of vinyl triethoxysilane based on the polymer oil and vinyl toluene was included within the resinifiable polymer mix. The flexural strength of the two laminates was determined in accordance with ASTM procedure 490–49T and the appearance of the laminates was observed as indicated below:

| Laminate | Appearance | Flexural Strength, p.s.i. |
|---|---|---|
| A | opaque | 40,000 |
| B | clear | 70,000 |

It is therefore evident that the strength and appearance of a reinforced plastic are substantially improved by incorporating an unsaturated organic silane in the resinifiable polymer mix.

EXAMPLE II

Sixty parts of the polydiolefin oil of Example I were mixed with 40 parts of vinyl toluene, 2 parts of dicumyl peroxide, and 2 parts of ditertiary butyl peroxide to form a resinifiable polymer mix. Glass cloth (181 weave) was coated with the vinyl silane ester of the monethyl ether of ethylene glycol in a separate operation. The cloth, with the finishing agent thereon, was subsequently impregnated with the resinifiable polymer mix. Fourteen plies of impregnated cloth were placed in a ⅛-inch mold and cured for 1 hour at 300° F. Laminate C, 65% glass, which resulted therefrom, was subjected to a postcure at 320° F. for 2 hours.

For comparison purposes, glass cloth was provided, without a finishing agent thereon, and 0.5 part of vinyl triethoxy silane were dissolved in the polymer mix. Laminate D was formed by impregnating the clean glass cloth with this modified mix and by curing in a similar manner as described for laminate C. The flexural strength of the two laminates was determined. The time to failure also was recorded as each laminate was subjected to a flexural stress of about 28,000 p.s.i. for 1 hour in water at 170° F. and a 38,000 p.s.i. stress thereafter. The results are shown in the table herebelow:

| Laminate | Flexural Strength (p.s.i.) | Hot Water Test Time to Failure (Min.) |
|---|---|---|
| C | 65,000 | 65 |
| D | 66,500 | 61 |

This example demonstrates that the expensive and time consuming operation of applying a silane finish to glass cloth before lamination with a resinifiable polymer mix can be eliminated by incorporating the silane finish into the mix used in fabrication.

EXAMPLE III

The following components were incorporated in a resinifiable polymer mix: 50 parts of the polydiolefin oil of Example I; 50 parts of vinyl toluene; 1.5 parts of dicumyl peroxide; 1.5 parts of ditertiary butyl peroxide; 0.5 part of the vinyl silane ester of the monoethyl ether of ethyl glycol.

Two laminates were each prepared by saturating 14 plies of glass cloth with the resinifiable polymer mix. However, the cloth in laminate E was previously coated with the same vinyl silane ester incorporated in the above polymer mix. In contrast, the glass cloth in laminate F had no finish thereon before saturation with the above resinifiable mix. Both laminates were cured for 1 hour in a mold at 300° F. followed by an 8-hour postcure at 320° F. The physical characteristics of these laminates are as follows:

| Laminate | Flexural Strength (p.s.i.) | Hot Water Test Time to Failure (Min.) |
|---|---|---|
| E | 66,500 | 80 |
| F | 67,000 | 97 |

This example shows that it is possible to coat glass with a silane finish during its manufacture and also to apply an additional coating to the cloth by saturation with the polymer mix. Thus, in commercial operations, where the finish on the glass may be incomplete and non-uniform, one may add additional silane ester in the resin to insure complete and uniform coating of the glass.

EXAMPLE IV

Laminate G was prepared by providing 181 glass cloth without any finishing agent thereon; impregnating the clean cloth, which had been stored in an atmosphere of high humidity, without a previous drying operation, with the resinifiable mix of Example III; forming layers of 14 plies of the impregnated cloth in a 1-inch press mold; and curing at a temperature of 300° F. for 1 hour.

Laminate H was prepared by providing 181 glass cloth without any finishing agent thereon; drying the clean cloth at a temperature of 400° F. for 3 hours at a pressure of 25 mm. Hg; saturating 14 plies of the dried cloth with the polymer mix of Example III containing 0.5 part of the vinyl silane; forming and curing with the same procedure as described for laminate G.

Laminate I was prepared by coating 181 glass cloth with a finishing agent comprising the vinyl silane ester of the monethyl ether of ethylene glycol; drying the silane-coated cloth at 400° F. for 3 hours with a pressure of 25 mm. Hg; impregnating 14 plies of the dried cloth with the mix of Example III; forming and curing with the same procedure as for laminate G.

The flexural strength of each of these three laminates was determined in accordance with ASTM 490–49T.

| Laminate: | Flexural strength, p.s.i. |
|---|---|
| G | 29,000 |
| H | 47,000 |
| I | 35,000 |

The above example demonstrates that the flexural strength of a reinforced plastic can be substantially increased by drying the reinforcing element therein before it is saturated with the resinifiable polymer mix and also be incorporating an unsaturated organic silane in the polymer mix. If the silane is coated on the reinforcing element, dried, and then saturated with the mix, an inferior reinforced plastic results therefrom. If no drying is employed at all, the end product also has a relatively low flexural strength.

EXAMPLE V

The following compounds were included within a resinifiable polymer mix: 50 parts of a polyester prepared from the glycol obtained by the condensation of an alkylene oxide with bisphenol-A esterified with fumaric acid; 50 parts of vinyl toluene; and 1 part of dicumyl peroxide.

Three laminates were prepared with this polyester mix. Laminate J was formed by saturating 14 plies of 181 glass cloth, without a finish thereon, with the mix. Laminate K was formed by coating 181 glass cloth with a finishing agent comprising vinyl silane and subsequently saturating 14 plies of the coated glass with the polyester mix. Laminate L was formed by saturating glass cloth, without a finishing agent thereon, with the above polyester mix in which 1 part of a vinyl silane ester of monoethyl ether of ethylene glycol was incorporated therein. Each of the three laminates was cured for 1 hour in a ⅛-inch press mold at a temperature of 275° F. with a postcure for 1 hour at 300° F. The flexural strength and time to failure in hot water at 170° F. of each were determined to be as follows:

| Laminate | Flexural Strength (p.s.i.) | Hot Water Test Time to Failure |
|---|---|---|
| J | 54,000 | 6 min. |
| K | 67,000 | 21 hours. |
| L | 62,000 | 3¼ hours. |

This example demonstrates that the strength of a polyester reinforced plastic is actually decreased when the unsaturated organic silane is incorporated in the polymer mix instead of being applied to the surface of the glass cloth before lamination with the mix. Also, the strength in water is greatly decreased. Therefore, it is a necessary requirement for the successful operation of this invention to utilize a curable polymer, e.g., a $C_4$ to $C_6$ conjugated diolefin, which does not contain OH or carboxylic groups. Furthermore, the electrical properties and stability at elevated temperatures of a reinforced plastic comprising a polydiolefin resin are superior to those comprising polyesters, epoxy resins, and the like.

EXAMPLE VI

Glass rovings were provided which contained 0.6% of butyl rubber on its surface as a size. The rovings were subsequently passed through an electric furnace at a temperature of 800° F. to remove the size. Upon cooling to 300° F., the heat cleaned rovings were passed through the resinifiable polymer mix of Example III. The rovings, with the mix impregnated thereon, were wound on a steel mandrel and heated for 1 hour at 300° F. The reinforced plastic pipe therefrom had excellent strength and was clear in appearance.

Glass rovings, containing a vinyl silane as a finishing agent and polyvinyl acetate as a size, were impregnated with the same resin mix. A reinforced plastic pipe was formed in a similar manner described above. However, a pipe very opaque in appearance and low in strength was obtained.

This example shows the superiority of incorporating the silane finishing agent within the resinifiable polymer mix during the preparation of a reinforced plastic pipe.

Having described the general nature and specific embodiments of this invention, the true scope is now particularly pointed out in the appended claims.

What is claimed is:

1. In a process for preparing a reinforced plastic, the improvement which comprises laminating a reinforcing element with a thermosetting resinifiable polymer mix comprising a reactive hydrocarbon liquid polymer of a $C_4$ to $C_6$ conjugated diolefin and an unsaturated organic silane having the formula: $R_nSi(OR_1)_{4-n}$ wherein R is selected from the group consisting of vinyl, allyl, methallyl and crotyl; $n$ is a positive integer selected from the group consisting of 1, 2 and 3; and $R_1$ is selected from the group consisting of alkyl and aryl; curing said laminate at a temperature between 250° and 400° F. in the presence of a peroxide catalyst to provide a unitary product.

2. In a process for preparing a reinforced plastic, the improvement which comprises laminating a dry glass cloth with a thermosetting resinifiable polymer mix comprising 100 parts of the liquid copolymer of butadiene with styrene, 30 to 50 parts of vinyl toluene, and 0.1 to 5 parts of vinyl triethoxy silane; curing said laminate at a temperature between 250° and 400° F. in the presence of 0.2 to 10 parts of dicumyl peroxide and ditertiary butyl peroxide to provide a unitary product.

3. In a process for preparing a reinforced plastic, the improvement which comprises heating glass cloth at a temperature between 200° and 1500° F. to remove size and moisture thereon; laminating said heat cleaned glass cloth with a resinifiable polymer mix comprising 100 parts of the liquid copolymer of butadiene with styrene, 30 to 50 parts of vinyl toluene, and 0.1 to 5 parts of vinyl triethoxy silane; curing said laminate at a temperature between 250° and 400° F. in the presence of 0.2 to 10 parts of dicumyl peroxide and ditertiary butyl peroxide to provide a unitary product.

4. In a process for preparing a reinforced plastic, the improvement which comprises providing glass cloth with a butyl rubber size thereon; heating said sized glass cloth at a temperature between 250° and 400° F. to remove said size; laminating said heat cleaned glass cloth with a thermosetting resinifiable polymer mix comprising 100 parts of the liquid copolymer of butadiene with styrene, 30 to 50 parts of vinyl toluene, and 0.1 to 5 parts of the vinyl silane ester of the monethyl ether of ethylene glycol; curing said laminate at a temperature between 250° and 400° F. in the presence of 0.2 to 10 parts of dicumyl peroxide and ditertiary butyl peroxide to provide a unitary product.

5. In a process for preparing a composite pipe by forming a cylinder of glass fibers embedded in a resin, the improvement which comprises saturating glass fibers with a thermosetting resinifiable polymer mix comprising a liquid polymer of a $C_4$ to $C_6$ conjugated diolefin and an unsaturated organic silane having the formula:

$$R_nSi(OR_1)_{4-n}$$

wherein R is selected from the group consisting of vinyl, allyl, methallyl and crotyl; $n$ is a positive integer selected from the group consisting of 1, 2 and 3; and $R_1$ is selected from the group consisting of alkyl and aryl; winding said saturated fibers about a mandrel to form the cylinder; curing said wound fibers with said resinifiable polymer mix thereon at a temperature between 250° and 400° F. in the presence of a peroxide catalyst to provide a unitary product.

6. A reinforced plastic which comprises a thermosetting resin bonded to a reinforcing element; said resin being a polymer mix cured in the presence of a peroxide catalyst; said polymer mix comprising a reactive hydrocarbon liquid polymer of a $C_4$ to $C_6$ conjugated diolefin and an unsaturated organic silane having the formula: $R_nSi(OR_1)_{4-n}$ wherein R is selected from the group consisting of vinyl, allyl, methallyl and crotyl; $n$ is a positive integer selected from the group consisting of 1, 2 and 3; and $R_1$ is selected from the group consisting of alkyl and aryl.

7. A reinforced plastic with increased strength which comprises a thermosetting resin bonded to glass cloth previously heated between 200 and 1500° F.; said resin being a polymer mix cured in the presence of 0.2 to 10 parts of dicumyl peroxide and ditertiary butyl peroxide; said polymer mix comprising 100 parts of the liquid copolymer of butadiene with styrene, 0 to 60 parts of vinyl toluene, and 0.1 to 5 parts of vinyl triethoxy silane.

8. A reinforced plastic with increased strength which comprises a thermosetting resin bonded to glass cloth previously heated between 200 and 1500° F.; said resin being a polymer mix cured in the presence of 0.2 to 10 parts of dicumyl peroxide and ditertiary butyl peroxide; said polymer mix comprising 100 parts of the liquid copolymer of butadiene with styrene, 30 to 50 parts of vinyl toluene, and 0.1 to 5.0 parts of the vinyl silane ester of the monoethyl ether of ethylene glycol.

9. A fiber reinforced plastic pipe with increased strength which comprises glass fibers laid up circumferentially in superimposed layers to form the peripheral shell of the pipe; said fibers being bonded to a thermosetting resin; said resin being a polymer mix cured in the presence of a peroxide catalyst; said polymer mix comprising a liquid polymer of a $C_4$ to $C_6$ conjugated diolefin and an unsaturated organic silane having the formula:

$$R_nSi(OR_1)_{4-n}$$

wherein R is selected from the group consisting of vinyl, allyl, methallyl and crotyl; $n$ is a positive integer selected from the group consisting of 1, 2 and 3; and $R_1$ is selected from the group consisting of alkyl and aryl.

References Cited in the file of this patent

UNITED STATES PATENTS

| | | |
|---|---|---|
| 2,482,307 | Walker et al. | Sept. 20, 1949 |
| 2,683,162 | Gleason | July 6, 1954 |
| 2,792,324 | Daley et al. | May 14, 1957 |
| 2,794,792 | Petze | June 4, 1957 |
| 2,831,829 | Brooks et al. | Apr. 22, 1958 |
| 2,859,198 | Sears et al. | Nov. 4, 1958 |
| 2,860,083 | Nitzsche et al. | Nov. 11, 1958 |
| 2,885,383 | Brooks | May 5, 1959 |
| 2,951,782 | Eilerman | Sept. 6, 1960 |